US012354513B2

(12) United States Patent
Lee et al.

(10) Patent No.: US 12,354,513 B2
(45) Date of Patent: Jul. 8, 2025

(54) CHARGE SHARING DRIVER CIRCUIT FOR DISPLAY AND OPERATING METHOD THEREOF

(71) Applicant: LX SEMICON CO., LTD., Daejeon (KR)

(72) Inventors: Chung Min Lee, Daejeon (KR); Jong Min Park, Daejeon (KR); Jung Min Choi, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 11 days.

(21) Appl. No.: 18/420,323

(22) Filed: Jan. 23, 2024

(65) Prior Publication Data

US 2024/0177642 A1 May 30, 2024

(30) Foreign Application Priority Data

Nov. 28, 2022 (KR) ........................ 10-2022-0161915

(51) Int. Cl.
*G09G 3/20* (2006.01)

(52) U.S. Cl.
CPC ....... *G09G 3/20* (2013.01); *G09G 2310/0291* (2013.01); *G09G 2330/021* (2013.01)

(58) Field of Classification Search
CPC ...... G09G 3/20; G09G 3/3614; G09G 3/3688; G09G 3/3208; G09G 3/36; G09G 2310/0291; G09G 2310/021; G09G 2320/0257
See application file for complete search history.

(56) References Cited

U.S. PATENT DOCUMENTS

| | | | | |
|---|---|---|---|---|
| 9,916,807 B2* | 3/2018 | Kim | G09G 3/3685 | |
| 12,047,074 B2* | 7/2024 | Chien | H03K 3/011 | |
| 2011/0164006 A1* | 7/2011 | Son | G09G 3/3614 | 345/204 |
| 2012/0280961 A1* | 11/2012 | Son | G09G 3/3685 | 345/87 |
| 2014/0043221 A1* | 2/2014 | Hasegawa | G09G 3/3614 | 345/89 |
| 2015/0310812 A1* | 10/2015 | Chen | G09G 3/20 | 345/96 |
| 2016/0005374 A1* | 1/2016 | Kim | G09G 3/3685 | 345/87 |
| 2019/0340994 A1* | 11/2019 | Chen | G09G 3/3688 | |

* cited by examiner

*Primary Examiner* — David Tung
(74) *Attorney, Agent, or Firm* — ROTHWELL, FIGG, ERNST AND MANBECK, P.C.

(57) ABSTRACT

Disclosed are a driver circuit for a display, which is capable of a two-stage charge sharing operation, and an operating method thereof.

18 Claims, 7 Drawing Sheets

【FIG. 1】
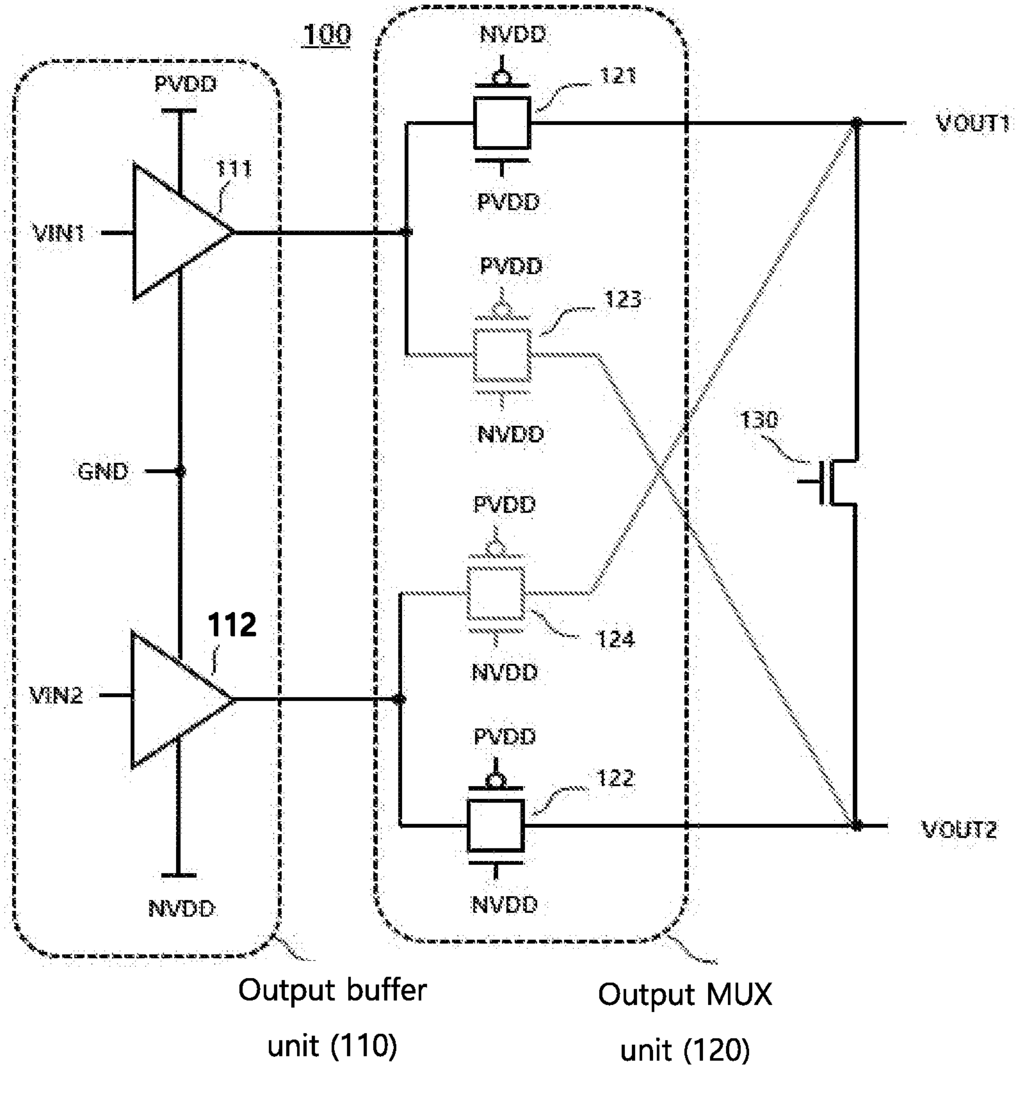

【FIG. 2】
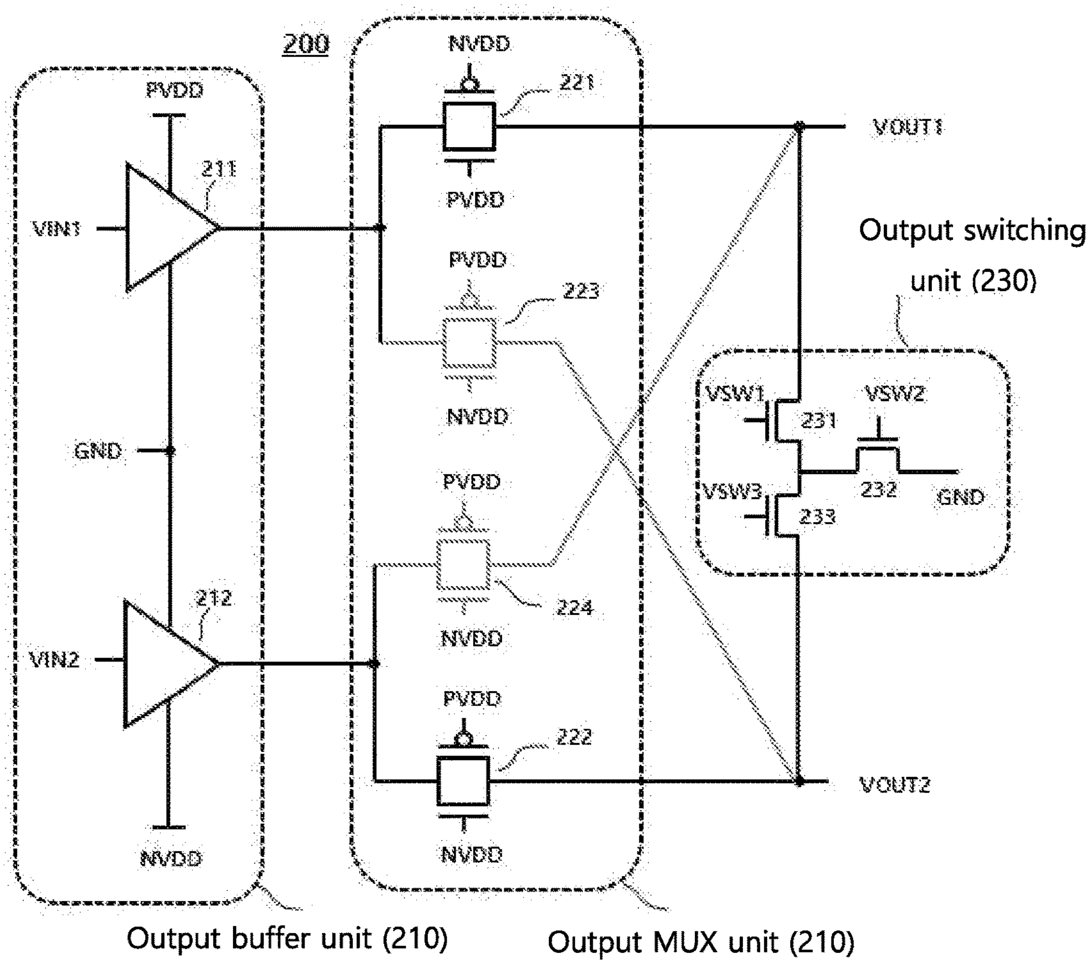

【FIG. 3】
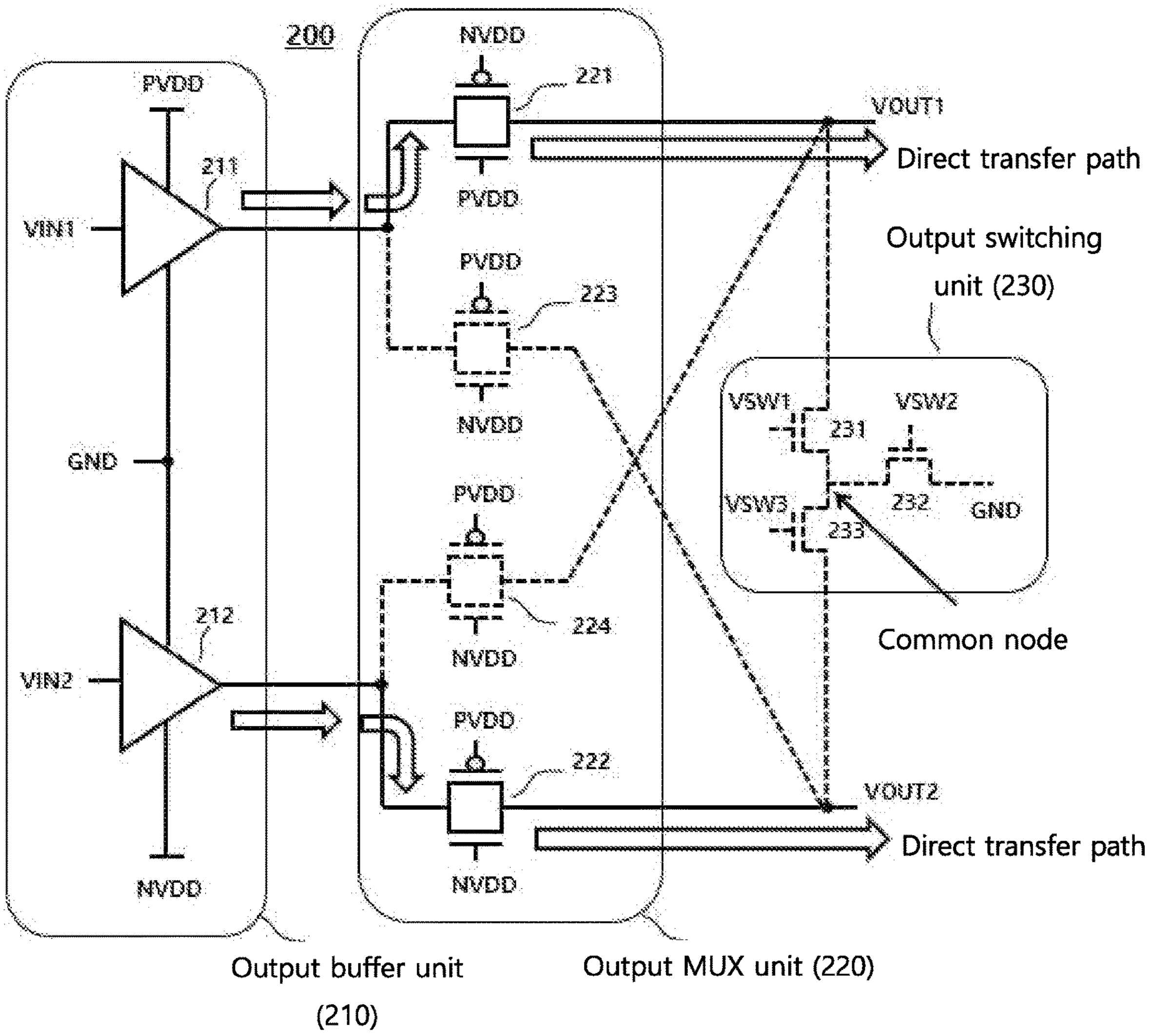

【FIG. 4】
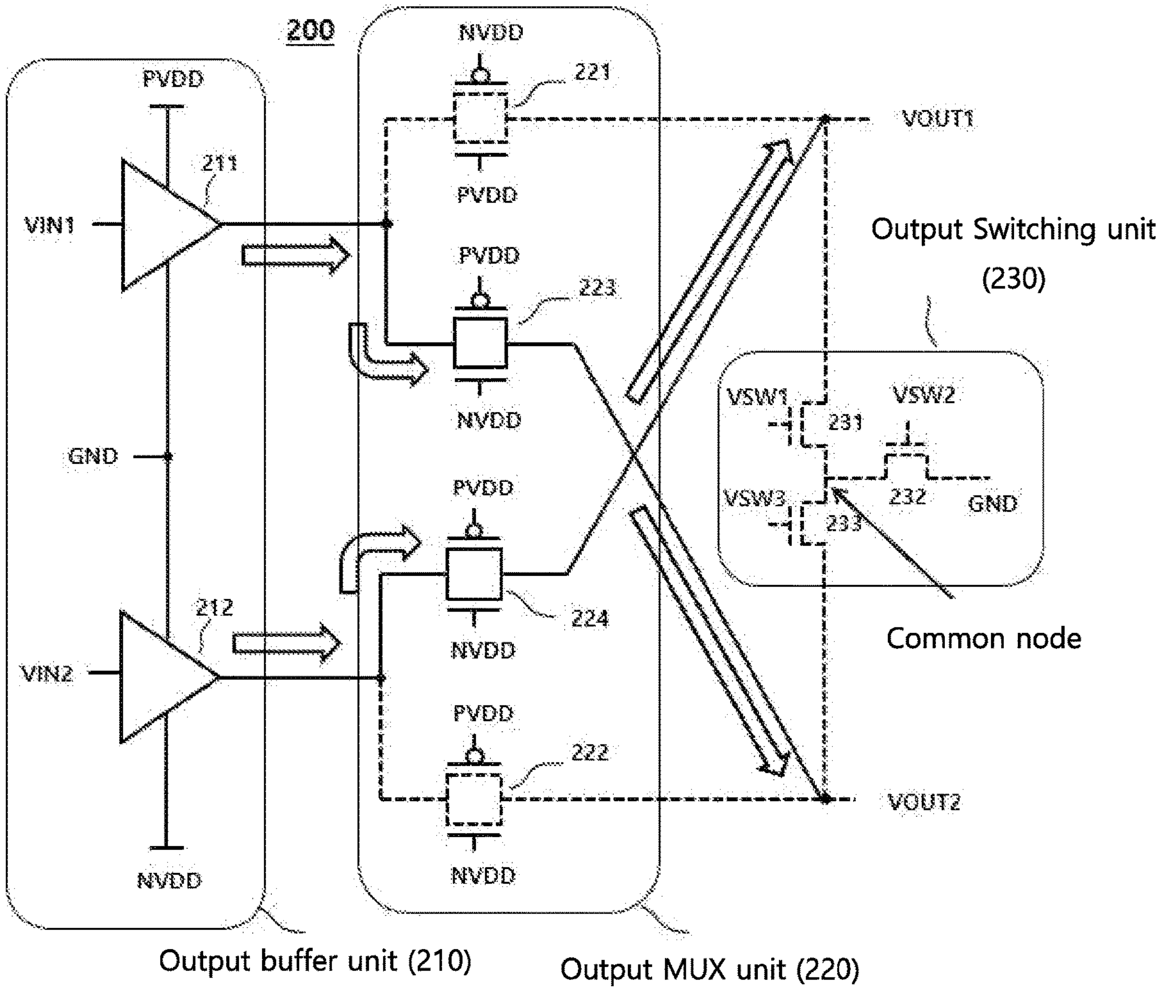

FIG. 5】
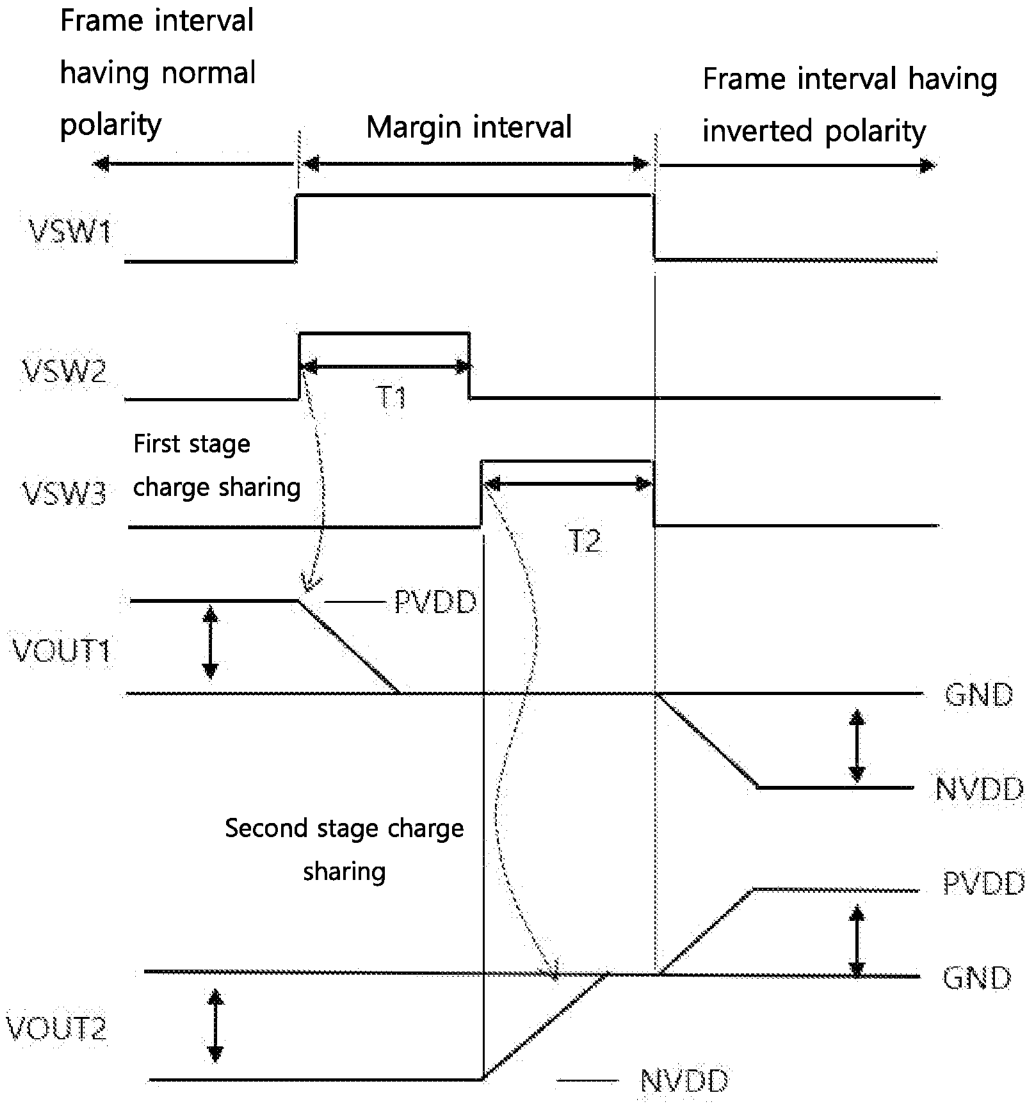

【FIG. 6】
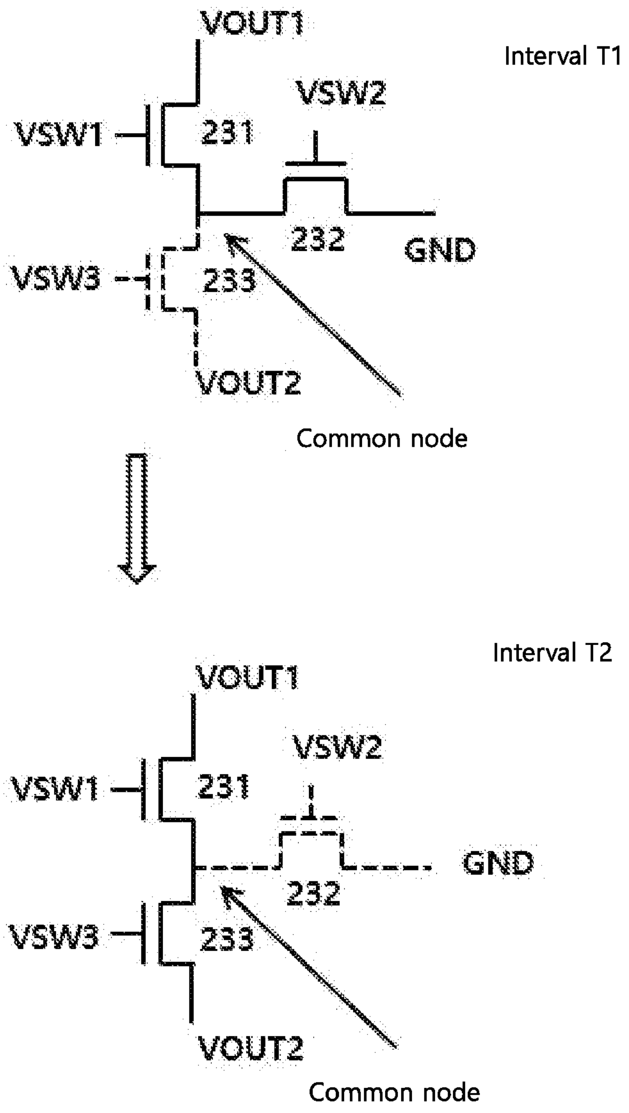

【FIG. 7】
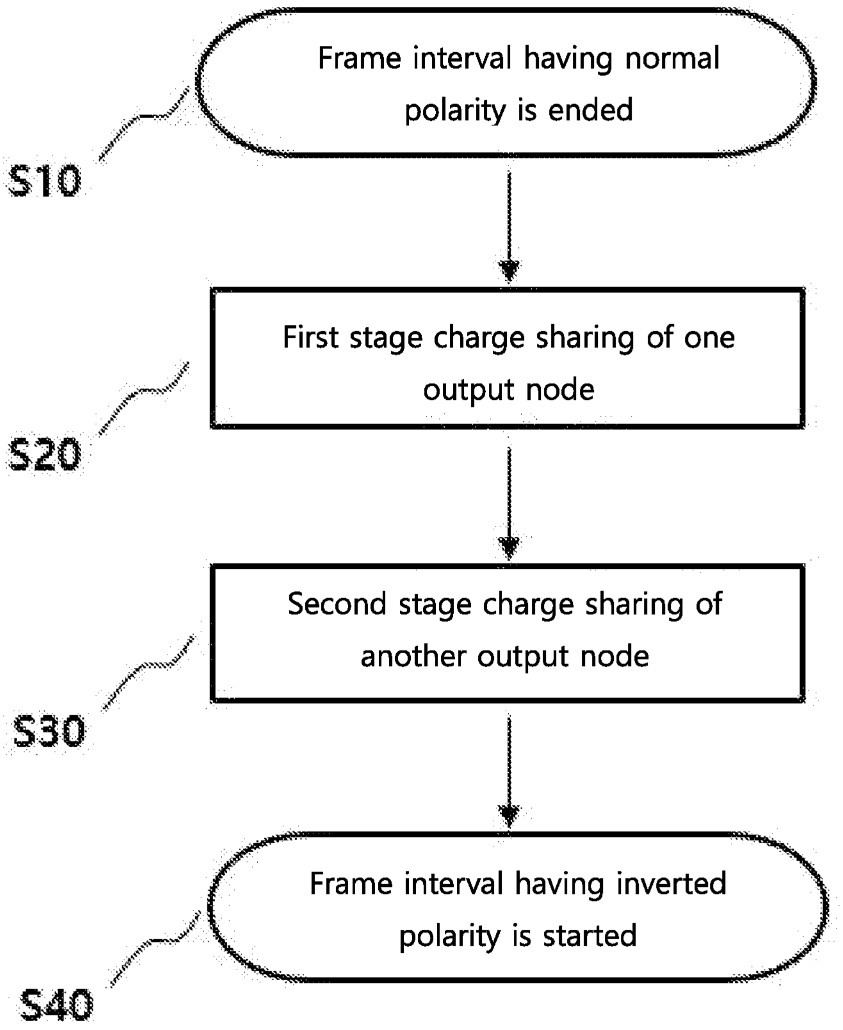

CHARGE SHARING DRIVER CIRCUIT FOR DISPLAY AND OPERATING METHOD THEREOF

Pursuant to 35 U.S.C. § 119(a), this application claims the benefit of earlier filing date and right of priority to Korean Application No. 10-2022-0161915, filed on Nov. 28, 2022, the contents of which are hereby incorporated by reference herein in their entirety.

BACKGROUND

1. Technical Field

The present disclosure relates to a charge sharing driver circuit for a display and an operating method thereof, and particularly, to a charge sharing driver circuit for a display using a two-stage charge sharing technology, which enables a transistor having a common and normal breakdown voltage to be used instead of a high-voltage transistor having a high breakdown voltage, and an operating method thereof.

2. Related Art

The size of a screen of a display device always craves a technical development direction for a larger size, lower power, and higher resolution. Accordingly, a larger number of display driver chips that provide image data to a display device are required, and efforts in the design for also achieving a higher speed and lower power are concentrated. The display driver chip is called a driver integrated circuit (IC) or a driving IC. Each of the pixels of a display screen, including an LCD or an OLED that is used a lot, includes a thin film transistor (TFT) as a switching element. A chip that drives in the column or source direction of the TFT is called a source driver chip (or a source driver IC (SDIC)), and a chip that drives in the gate direction of the TFT is called a gate driver chip (or a gate driver IC).

In view of the characteristics of the display pixel, if only a voltage in one direction continues to be applied through the source of the TFT, image sticking occurs due to a hysteresis phenomenon. In order to prevent the image sticking, voltages for the display pixel are balanced so that image sticking does not occur in a screen in a way to drive the display pixel by applying a voltage having an inverted polarity for each frame interval. To this end, both a positive (+) power source voltage and a negative (−) power source voltage are used in the source driver chip unlike in another type of a semiconductor chip. The positive (+) power source voltage and the negative (−) power source voltage have the same absolute value. In this case, a voltage that is twice a power source voltage is applied to an output multiplexer and an output transistor that are connected to the output buffer of the display driver chip. A voltage-resistant characteristic of these elements need to be inconveniently larger than that of a common transistor. The voltage-resistant characteristic is indicated as a breakdown voltage in the industry, and is abbreviated as "BVDSS".

A circuit illustrated in FIG. 1 is taken as an example in order to describe the problem of the breakdown voltage more specifically. The circuit of FIG. 1 is presented as a comparative example by inventors of the present disclosure. It is to be noted that the circuit does not essentially indicate a conventional technology. An output circuit 100 included in a driver chip includes an output buffer unit 110 including output buffer circuits 111 and 112, an output multiplexer (MUX) unit 120 including transfer switches 121 to 124, and an output switch 130. A positive (+) power source voltage is indicated as PVDD, and a negative (−) power source voltage is indicated as NVDD. If PVDD is a voltage of +7.4 V, NVDD is a voltage of −7.4 V. The two voltages merely have opposite polarities, and have the same absolute value in the voltage size. A middle voltage between PVDD and NVDD is 0 V, which is grounded (GND). In the case of a system not having a separate ground, the middle voltage may have a middle value between PVDD and NVDD instead of GND. For example, if PVDD is 9 V and NVDD is 0 V, the middle value is 4.5 V. A pair of input signals VIN1 and VIN2 is connected to the output buffer unit 110. The transfer switches 121 and 123 and transfer switches 124 and 122 of the output MUX unit 120 are connected to the output buffer circuits 111 and 112, respectively, and selectively connect the pair of input signals VIN1 and VIN2 to output node signals VOUT1 and VOUT2, respectively, through direct transfer paths or cross transfer paths. Furthermore, the name of each node and a name indicative of the voltage of each node may be interchangeably used, for convenience of description.

The output node signals VOUT1 and VOUT2 of the driver chip each swing between PVDD and NVDD at timing of each direct transfer path and timing of each cross transfer path. As a result, a voltage that is twice the positive (+) power source voltage is applied to each of the transfer switches 121 to 124 and the output switch 130. For this reason, elements each having a high BVDSS voltage, that is, a high breakdown voltage, are required unlike common other transistors. That is, a driver chip needs to be separately manufactured by using high-voltage transistors unlike common transistors. Accordingly, a manufacturing cost for the driver chip is increased because a separate design rule or a separate mask step is required in a semiconductor manufacturing process. This is described later.

SUMMARY

Various embodiments are directed to providing a circuit construction which does not use an element that requires a high breakdown voltage in an output circuit included in a chip that drives a display.

Various embodiments are directed to providing a charge sharing output driver circuit having reduced power consumption and an improved operating speed.

In an embodiment, a charge sharing driver circuit for a display may include an output buffer unit configured to buffer a pair of input signals, a first output node and a second output node connected to a display panel, an output MUX unit configured to electrically connect the first output node and the output buffer unit, and the second output node and the output buffer unit, and an output switching unit connected between the first output node and the second output node. A first switching element of the output switching unit is connected between the first output node and a common node. A second switching element of the output switching unit is connected between the common node and a ground. A third switching element of the output switching unit is connected between the second output node and the common node.

In an embodiment, a charge sharing driver circuit for a display may include an output buffer unit including a first buffer amplifier and a second buffer amplifier, a first output node and a second output node electrically connected to a display panel, an output MUX unit, and an output switching unit disposed between the first output node and the second output node. The output switching unit performs a switching operation by dividing, into two intervals, an interval in which the transfer of a signal from the output MUX unit is not present.

In an embodiment, an operating method of a charge sharing driver circuit for a display may include transferring, by an output buffer unit, a pair of input signals, transferring, by an output MUX unit, the transferred signal to a pair of output nodes by using direct transfer paths through a first transfer switch and a second transfer switch during a frame interval having a normal polarity and using cross transfer paths through a third transfer switch and a fourth transfer switch during a frame interval having an inverted polarity, and performing, by an output switching unit, a first stage for charge sharing between a voltage level of a first output node, among the pair of output nodes, and a ground voltage and a second stage for charge sharing between the voltage level of the first output node and a voltage level of a second output node, among the pair of output nodes, during a margin interval.

According to embodiments of the present disclosure, it is possible to reduce a manufacturing cost for a display driver chip due to a reduced chip area because a high voltage element can be excluded by using a middle voltage element.

According to embodiments of the present disclosure, it is also possible to reduce AC power consumption due to charge sharing.

BRIEF DESCRIPTION OF THE DRAWINGS

FIG. 1 is a diagram for describing the background of the present disclosure.

FIG. 2 illustrates a circuit diagram according to an embodiment of the present disclosure.

FIG. 3 is a diagram illustrating direct transfer paths that are formed during a frame interval having a normal polarity in an embodiment of the present disclosure.

FIG. 4 is a diagram illustrating cross transfer paths that are formed during a frame interval having an inverted polarity in an embodiment of the present disclosure.

FIG. 5 illustrates a timing diagram and a voltage waveform according to an embodiment of the present disclosure.

FIG. 6 is a diagram illustrating an operation of some circuits according to an embodiment of the present disclosure.

FIG. 7 is a diagram illustrating an operating method according to another embodiment of the present disclosure.

DETAILED DESCRIPTION

Some terms are described in advance before the contents of embodiments of the present disclosure are described. An “element” refers to an active element manufactured as a MOS transistor. A “middle voltage element” means an element that has a breakdown voltage characteristic of about power source voltage or an element that has a value obtained by adding some voltage margin to the power source voltage, among elements. For example, if a positive power source voltage is 7.4 V and a negative power source voltage is −7.4 V, the middle voltage element has a value to which some margin voltage has been added compared to approximately 7.4 V. A “high voltage element” refers to an element having a breakdown voltage characteristic that is equal to or greater than twice the breakdown voltage characteristic of a power source voltage. For example, if a positive power source voltage is 7.4 V and a negative power source voltage is −7.4 V, the high voltage element refers to an element having a breakdown voltage of at least 14.8 V or more.

Hereinafter, embodiments of the present disclosure are described with reference to a circuit diagram illustrated in FIG. 2. An output circuit 200 of a display driver chip according to an embodiment of the present disclosure includes an output buffer unit 210, an output MUX unit 220, and an output switching unit 230. The output buffer unit 210 includes buffer amplifiers 211 and 212 having a great driving ability in order to drive a screen pixel of a display. The buffer amplifier may be a unity gain buffer having a gain of 1, if necessary. The input of the output MUX unit 220 is connected to the pair of buffer amplifiers 211 and 212. The output MUX unit 220 includes first and second transfer switches 221 and 222 in direct transfer paths and third and fourth transfer switches 223 and 224 in cross transfer paths.

The output switching unit 230 includes multiple switching elements 231 to 233, and is disposed between a first output node VOUT1 and a second output node VOUT2. The first to third switching elements 231 to 233 become on or off by VSW1 to VSW3, that is, switching control signals, respectively. The first switching element 231 is connected between the first output node VOUT1 and a common node. The second switching element 232 is connected between a ground voltage GND and the common node. The third switching element is connected between the common node and the second output node VOUT2.

The voltage signals of the first and second output nodes are indicated as VOUT1 and VOUT2, respectively. For reference, in FIG. 2, the indication of a capacitive load of each output node or a GND node indicative of the ground voltage GND may be omitted. The capacitive load may include both parasitic capacitance and equivalent capacitance of a corresponding node.

An operation of the circuit during a frame interval having a normal polarity is described with reference to a circuit diagram of FIG. 3 and a timing diagram of FIG. 5. The voltage level of the output of the first buffer amplifier 211, that is, one of the buffer amplifiers 211 and 212 of the output buffer unit 210, swings to have a value between PVDD, that is, a positive (+) power source voltage, and GND, that is, the ground voltage. The voltage level of the output of the second buffer amplifier 212, that is, the other of the buffer amplifiers 211 and 212 of the output buffer unit 210, swings to have a value between GND, that is, the ground voltage and NVDD, that is, a negative (−) power source voltage. For reference, the ground voltage is described more specifically. PVDD, that is, the positive (+) power source voltage, and NVDD, that is, the negative (−) power source voltage, have symmetrical values on the basis of the ground voltage.

In a frame interval having a normal polarity, the first and second transfer switches 221 and 222 in the direct transfer paths are turned on. In contrast, the third and fourth transfer switches 223 and 224 in the cross transfer paths are turned off. The third and fourth transfer switches 223 and 224 that have been turned off are indicated by dotted lines. The direct transfer paths are indicated by arrows in the circuit diagram of FIG. 3. Accordingly, the output of the first buffer amplifier 211 is transferred to the first output node VOUT1 via the first transfer switch 221. The voltage level of the output of the first buffer amplifier 211 swings between the positive power source voltage PVDD and the ground voltage GND. Accordingly, as illustrated in FIG. 5, the voltage level of the first output node VOUT1 also has a value that varies between the positive power source voltage PVDD and the ground voltage GND during the frame interval having the normal polarity. Similarly, the output of the second buffer amplifier 212 is transferred to the second output node VOUT2 via the second transfer switch 222. The voltage level of the output of the second buffer amplifier 212 swings between the ground voltage GND and the negative power source voltage NVDD. During such an interval, all the elements 231 to 233 included in the output switching unit 230 are turned off, and a maximum voltage is not applied all the elements illustrated in FIG. 3. In this case, the maximum voltage means a difference between the positive power source voltage PVDD and the negative power source voltage NVDD. For example, if the positive power source voltage PVDD is 7.4 V and the negative power source voltage NVDD is −7.4 V, a maximum voltage is 14.8 V.

Contrary to the frame interval having the normal polarity, in a frame interval having an inverted polarity, the third and fourth transfer switches 223 and 224 in the cross transfer paths are turned on As illustrated in FIG. 4. In contrast, the first and second transfer switches 221 and 222 in the direct transfer paths are turned off. The first and second transfer switches that have been turned off are indicated by dotted lines. The cross transfer paths are indicated by arrows in a circuit diagram of FIG. 4. Accordingly, the output of the first buffer amplifier 211 is transferred to the second output node VOUT2 via the third transfer switch 223. The voltage level of the output of the first buffer amplifier 211 has a value that swings between the positive power source voltage PVDD and the ground voltage GND. Unlike in the frame interval having the normal polarity, the voltage level of the second output node VOUT2 has a value that varies between the positive power source voltage PVDD and the ground voltage GND. Similarly, the output of the second buffer amplifier 212 is transferred to the first output node VOUT1 via the fourth transfer switch 224. The voltage level of the first output node VOUT1 has a value that swings between the ground voltage GND and the negative power source voltage NVDD. During the frame interval having the inverted polarity, all the elements 231 to 233 included in the output switching unit 230 are turned off. Furthermore, as in the frame interval having the normal polarity, a maximum voltage is not applied to all the elements illustrated in FIG. 4. In a margin interval between the frame interval having the normal polarity and the frame interval having the inverted polarity, the output switching unit 230 performs a switching operation by dividing the switching operation into two stages for charge sharing.

Hereinafter, the two-stage charge sharing operation is described with reference to drawings of FIGS. 5 and 6. Prior to the description, it is assumed that a voltage right before the first output node VOUT1 has reached the positive power source voltage PVDD and a voltage right before the second output node VOUT2 has reached the negative power source voltage NVDD. Such an assumption is made in order to more easily describe an action and operation according to an embodiment of the present disclosure by assuming the most extreme voltage condition. Practically, the voltage level of the first output node VOUT1 level may have any one voltage value between the positive power source voltage PVDD and the ground GND, and the voltage level of the second output node VOUT2 may also have any one voltage value between the negative power source voltage NVDD and the ground GND.

During the frame interval having the normal polarity, the voltage level of the first output node VOUT1 has an arbitrary value between the positive power source voltage PVDD and the ground voltage GND. In this case, it is to be noted that the voltage level of the first output node VOUT1 has been assumed to have the positive power source voltage PVDD as described above, for convenience of description.

When the margin interval is started, during an interval T1, the first switching element 231 and the second switching element 232, among the elements included in the output switching unit 230, are first turned on by the control signals VSW1 and VSW2 as illustrated in the timing diagram of FIG. 5. By the turn-on operation, the voltage level of the first output node VOUT1 is decreased from the positive power source voltage PVDD to the ground voltage GND, so that first stage charge sharing occurs. The interval is indicated as "T1" in FIG. 5, and corresponds to an upper circuit in FIG. 6. As described above, the third switching element 233 that has been turned off is indicated by a dotted line.

When an interval T2 is started, the second switching element 232 is turned off, but the third switching element 233 is turned on by the control signal VSW2. At this time, the first switching element 231 maintains the turn-on state. By the switching operation, the voltage level of the first output node VOUT1 that was previously decreased to the ground voltage GND is subjected to charge sharing along with the voltage level of the second output node VOUT2 having the negative power source voltage NVDD. An operation of this interval is indicated as "T2" in the timing diagram of FIG. 5, and corresponds to a lower circuit diagram in FIG. 6.

Simultaneously with the termination of the margin interval, all the switching elements of the output switching unit 230 are turned off. The first output node VOUT1 and the second output node VOUT2 are electrically isolated from each other and prepared to not have an influence on an operation during a next frame interval.

During the second stage charge sharing operation that is performed during the margin interval as described above, a maximum voltage is not applied to any of the switching elements of the output switching unit 230. For example, in the case of a display driver chip using the positive power source voltage of 7.4 V and the negative power source voltage of −7.4 V, each of the switching elements 231 to 233 of the output switching unit 230 according to an embodiment of the present disclosure has only to be a "middle voltage element" having a breakdown voltage (BVDSS) characteristic of 7.4 V to which some margin voltage has been added. Accordingly, there is an advantage in that each of the switching elements 231 to 233 does not need to be a "high voltage element" having PVDD-NVDD, that is, a breakdown voltage of 14.8 V. Due to such an advantage, a separate process for manufacturing an element having a high breakdown voltage is not required, or a separate design rule capable of withstanding a high breakdown voltage is not required.

Hereinafter, the aforementioned advantage is described in detail. The separate element for a high breakdown voltage may be manufactured by using a method of forming an additional or separate active region in which the concentration of impurities has been changed by implanting additional ions into the drain region of a MOS transistor, for example. As another method, a method of raising the breakdown voltage of a PN junction diode of a MOS transistor by separately forming a well to which the MOS transistor belongs may also be used. These methods are disadvantageous in that a separate ion implantation step needs to be added. However, in an embodiment of the present disclosure, such additional manufacturing steps are not required.

The advantage in that the separate design rule for the high voltage element is not required is as follows. For example, assuming that the width and length of a MOS transistor element (i.e., a "middle voltage element") having a minimum size, which is used for a power source voltage of 7.4

V, are 0.6 um and 0.9 um, in order to withstand a voltage of 14.8 V, an element (i.e., a "high voltage element") having a width and length greater than the width and length of the middle voltage element is required. The high voltage element can accommodate a higher voltage because the size of a voltage that is applied per unit length is attenuated due to its large size. Accordingly, the high voltage element has a high breakdown voltage. If an element that is double in size is required, the gate area of a transistor is quadrupled because each of the width and length of the element needs to be doubled. Accordingly, there is a disadvantage in that economics are reduced because a more substrate area is required. However, such a disadvantage can also be solved by the circuit construction and operation according to an embodiment of the present disclosure.

Design engineers in the field naturally accept that the charge sharing that is achieved by the two-stage switching operation divided into the intervals T1 and T2 operates according to the same principle although the frame interval having the inverted polarity is changed into the frame interval having the normal polarity.

According to an embodiment of the present disclosure, it is not necessary to specially form a high voltage element in various transistors of the output MUX unit 220 and various switching elements of the output switching unit 230.

Accordingly, the breakdown voltage (BVDSS) of a PN junction diode that is formed between an active region, such as the drain or source of the transistor, and a well has only to be always PVDD or higher. It is not necessary to secure 2 PVDD or more, that is, a maximum voltage. Furthermore, a separate ion implantation process for securing a maximum breakdown voltage or an additional photomask step therefor can be omitted. Furthermore, there are advantages in that a cost for manufacturing photomasks can be reduced, a cost for a semiconductor manufacturing process can be reduced, and a process period can also be reduced.

Another embodiment of the present disclosure is derived from the aforementioned embodiment. The derived embodiment relates to a method for the two-stage switching operation of the output switching unit 230 as illustrated in FIG. 7.

When one frame interval, for example, an image data transfer operation that is performed during the frame interval having the normal polarity is terminated (step S10), after charge sharing in which the voltage level of one output node, among the pair of output nodes, is changed into the middle voltage level by the first stage switching operation is first performed (step S20), charge sharing in which the voltage level of the other output node, among the pair of output nodes, is changed by the second stage switching operation is performed (step S30). When all of types of charge sharing of several steps, which are performed during the margin interval, are terminated, the frame interval having the inverted polarity is started (step S40). Each of the first and second stage switching operations is a charge sharing operation using the middle voltage. The voltage levels of the first output node VOUT1 and the second output node VOUT2 deviate from an extreme operation of being charged or discharged between the positive (+) power source voltage PVDD and the negative (−) power source voltage NVDD. As a result, there are advantages in that power consumption is reduced and an operating speed becomes fast because the time taken for the charging and discharging is reduced. Such effects naturally appear by the same switching operation even when the frame interval having the inverted polarity is changed into the frame interval having the normal polarity.

What is claimed is:

1. A charge sharing driver circuit for a display, comprising:
- an output buffer unit configured to buffer a pair of input signals;
- a first output node and a second output node each connected to a display panel;
- an output MUX unit configured to electrically connect the first output node and the output buffer unit, and the second output node and the output buffer unit; and
- an output switching unit connected between the first output node and the second output node,
- wherein a first switching element of the output switching unit is connected between the first output node and a common node, a second switching element of the output switching unit is connected between the common node and a ground, and a third switching element of the output switching unit is connected between the second output node and the common node.

2. The charge sharing driver circuit of claim 1, wherein each of the first to third switching elements comprises a middle voltage element that has a breakdown voltage characteristic of which has a value based on a power source voltage.

3. The charge sharing driver circuit of claim 1, wherein each of the first to third switching elements is configured to be turned off during a frame interval having a normal polarity and during a frame interval having an inverted polarity.

4. The charge sharing driver circuit of claim 1, wherein the output switching unit 230 is configured to perform a switching operation by dividing, into two intervals, a margin interval that does not belong to a frame interval having a normal polarity or a frame interval having an inverted polarity.

5. The charge sharing driver circuit of claim 4, wherein the two intervals comprise:
- a first interval in which a voltage level of the first output node and a ground voltage are subjected to charge sharing, and
- a second interval in which a voltage level of the first output node and a voltage level of the second output node are subjected to charge sharing.

6. The charge sharing driver circuit of claim 1, wherein the output buffer unit comprises:
- a first buffer amplifier connected between a positive power source voltage and the ground; and
- a second buffer amplifier connected between the ground and a negative power source voltage.

7. The charge sharing driver circuit of claim 1, wherein the output MUX unit comprises:
- a first transfer switch connected between an output terminal of a first buffer amplifier of the output buffer unit and the first output node;
- a second transfer switch connected between an output terminal of a second buffer amplifier of the output buffer unit and the second output node;
- a third transfer switch connected between the output terminal of the first buffer amplifier of the output buffer unit and the second output node; and
- a fourth transfer switch connected between the output terminal of the second buffer amplifier of the output buffer unit and the first output node.

8. A charge sharing driver circuit for a display, comprising:
- an output buffer unit comprising a first buffer amplifier and a second buffer amplifier;

a first output node and a second output node each electrically connected to a display panel;

an output MUX unit; and an output switching unit disposed between the first output node and the second output node, wherein the output switching unit is configured to perform a switching operation by dividing, into two intervals, an interval in which a transfer of a signal from the output MUX unit is not present, and the output switching unit comprises:

a first switching element connected between the first output node and a common node;

a second switching element connected between the common node and a ground; and a third switching element connected between the second output node and the common node.

9. The charge sharing driver circuit of claim 8, wherein the first to third switching elements that constitute the output switching unit are turned off during a frame interval having a normal polarity and a frame interval having an inverted polarity.

10. The charge sharing driver circuit of claim 8, wherein the two intervals comprise:

a first interval in which a voltage level of the first output node and a ground voltage are subjected to charge sharing, and a second interval in which the voltage level of the first output node and a voltage level of the second output node are subjected to charge sharing.

11. The charge sharing driver circuit of claim 8, wherein each of the first to third switching elements comprises a middle voltage element that has a breakdown voltage characteristic of which has a value based on a power source voltage.

12. The charge sharing driver circuit of claim 8, wherein the output MUX unit comprises:

a first transfer switch and a third transfer switch each connected to an output of the first buffer amplifier; and a second transfer switch and a fourth transfer switch each connected to an output of the second buffer amplifier.

13. The charge sharing driver circuit of claim 8, wherein the output MUX unit is configured to stops a transfer of a signal during a frame interval having a normal polarity or a frame interval having an inverted polarity.

14. The charge sharing driver circuit of claim 12, wherein the output MUX unit is configured to:

forms direct transfer paths through the first transfer switch and the second transfer switch during one of a frame interval having a normal polarity or a frame interval having an inverted polarity, and cross transfer paths through the third transfer switch and the fourth transfer switch during the other of the frame interval having the normal polarity or the frame interval having the inverted polarity.

15. An operating method of a charge sharing driver circuit for a display, the operating method comprising:

transferring, by an output buffer unit, a pair of input signals;

transferring, by an output MUX unit, the transferred pair of input signals to a pair of output nodes by 1) using direct transfer paths through a first transfer switch and a second transfer switch during a frame interval having a normal polarity or 2) using cross transfer paths through a third transfer switch and a fourth transfer switch during a frame interval having an inverted polarity; and performing, by an output switching unit, a first stage for charge sharing between a voltage level of a first output node, among the pair of output nodes, and a ground voltage and a second stage for charge sharing between the voltage level of the first output node and a voltage level of a second output node, among the pair of output nodes, during a margin interval, wherein:

the first stage is performed by first and second switching elements included in the output switching unit, and the second stage is performed by the first switching element and a third switching element.

16. The operating method of claim 15, wherein:

the first stage is performed as a result of the voltage level of the first output node being between a positive power source voltage and the ground voltage, and the second stage is performed as a result of the voltage level of the second output node being between a negative power source voltage and the ground voltage.

17. The operating method of claim 15, wherein the margin interval is an interval between the frame interval having the normal polarity and the frame interval having the inverted polarity.

18. The operating method of claim 17, wherein:

the pair of input signals output by the output buffer unit is directly transferred to the pair of output nodes during the frame interval having the normal polarity, after the frame interval having the normal polarity elapses, the first stage and the second stage are performed during the margin interval, and after the margin interval elapses, the pair of input signals output by the output buffer unit is transferred to the pair of output nodes in a cross way during the frame interval having the inverted polarity.

* * * * *